United States Patent
Guigné et al.

(10) Patent No.: US 9,568,627 B2
(45) Date of Patent: Feb. 14, 2017

(54) SYSTEM AND METHOD FOR ADAPTIVE CLASSIFICATION AND FILTERING FOR IMAGING DIFFUSED ENERGY FROM THE EARTHS SUBSURFACE

(71) Applicant: Acoustic Zoom, Inc., Paradise (CA)

(72) Inventors: Jacques Y. Guigné, Paradise (CA); James A. Stacey, St. John's (CA); Clyde J. Clements, St. John's (CA)

(73) Assignee: Acoustic Zoom, Inc., Paradise, NL (CA)

(*) Notice: Subject to any disclaimer, the term of this patent is extended or adjusted under 35 U.S.C. 154(b) by 448 days.

(21) Appl. No.: 14/278,446

(22) Filed: May 15, 2014

(65) Prior Publication Data
US 2015/0331123 A1 Nov. 19, 2015

(51) Int. Cl.
*G06F 19/00* (2011.01)
*G01V 1/28* (2006.01)
*G01V 1/34* (2006.01)

(52) U.S. Cl.
CPC .......... *G01V 1/28* (2013.01); *G01V 1/282* (2013.01); *G01V 1/34* (2013.01)

(58) Field of Classification Search
CPC ....... E21B 43/243; E21B 43/24; E21B 43/305
USPC ............. 702/16, 13–14, 182–185, 188
See application file for complete search history.

(56) References Cited

U.S. PATENT DOCUMENTS 5,920,828 A * 7/1999 Norris .................. G01V 1/003
702/14
5,987,385 A * 11/1999 Varsamis ............ E21B 47/0002
702/6

* cited by examiner

Primary Examiner — Edward Raymond
(74) Attorney, Agent, or Firm — Richard A. Fagin (57) ABSTRACT

A method for imaging the Earth's subsurface includes taking summed recordings of signals acquired by a plurality of seismic sensors disposed above the volume in response to repeated actuations of a seismic energy source. A travel time of seismic energy is determined from a position of the source to a selected image point in the volume and from the image point to each seismic sensor. A time-delayed scanline gather is generated from the travel times using a model of spatial distribution of acoustic properties of formations in the volume. A template image of backscattered energy from the image point is generated based on the model. The flattened scanline gather is singular value decomposed. The template image is projected onto the decomposed time-delayed scanline gather. Components from the projection are used to determine signal and interference. Weights are calculated for beamforming of the determined signal component. The weights and delay times are used to cause the focal point of the beamforming to be at the image point.

11 Claims, 5 Drawing Sheets

SYSTEM AND METHOD FOR ADAPTIVE CLASSIFICATION AND FILTERING FOR IMAGING DIFFUSED ENERGY FROM THE EARTHS SUBSURFACE

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND

This disclosure is related to the field of acoustic imaging of the Earth's subsurface. More specifically, the disclosure relates to methods for acquiring and processing acoustic signals from an array of sensors deployed above an area of the subsurface to be imaged.

Guigné et al. (U.S. Pat. No. 7,830,748) discloses a method for acoustic imaging of the Earth's subsurface using a fixed position seismic sensor array and beam steering for seismic surveying at higher lateral and vertical resolutions than currently possible with conventional 3D reflection seismic surveys. The method of disclosed in the '748 patent is based on a multiple line sensor array with a plurality of select seismic sensors having "dense" sensor spacing of adjacent sensors, i.e., no greater than ½ wavelength of the detected acoustic energy, to eliminate spatial aliasing of received signals at all wavelengths of interest. The method and system disclosed therein includes an array of broadband sources of acoustic energy capable of low order of transmit beam steering, a stationary source-receiver geometry to facilitate a plurality of source activations and common-receiver (i.e., vertical) stacking for incoherent noise suppression, strict quality control of sensor "trace" (recording of sensor amplitude with respect to time) data prior to data processing. A method of beam steering is disclosed to define the spatial response of the sensor array to sharply focus with higher lateral and vertical resolution at a particular 3D point in the Earth's subsurface using travel-times calculated in either time-migration or depth-migration domains, shading of the steered receiver beam to suppress the side-lobe pass-band for coherent interference. Multiple applications of the above method may be used at separated times to enable 4D imaging of the subsurface.

The current art of delay-filter-sum beamforming as disclosed in the '748 patent where filter coefficients are defined to modify (or shade) the side-lobe response of the sensor array, is well understood as belonging to the class of spectral-based algorithms for spatial-temporal (Wiener) filters. The determination of optimal filter coefficients may be performed according to a number of different algorithms; for example, constrained minimum least-mean-squares optimization using the Levinson algorithm. Alternative algorithms and application-specific filter designs are generally formulated as a constrained optimization problem with different choices of cost functions and constraints on the solutions. See, Kootsookos, P. J., Ward, D. B., Williamson, R. C., "Imposing pattern nulls on broadband array responses," J. Acoust. Soc. Am., Vol. 105, No. 6, June 1999.

A general underlying requirement of Wiener filter theory is the mathematical existence of a solution, which requires that there exist a matrix of measured correlations between sensors for a sufficient range of space and/or time dimensions with a rank equal or greater than the number of filter coefficients being determined. Apart from a normalization constant, this matrix is also known in the art as a covariance matrix. For problems where the rank of this correlation matrix is less than the number of filter coefficients being sought, there is no solution. Despite the lack of a formal solution, it is sometimes proposed that a "generalized inverse" of the rank-deficient correlation matrix provides an optimal filter in a least-squares sense.

Another limitation of the present art of determining optimal filter coefficients lies in the lack of scalability of the solution methods. The time required to obtain a solution to the filter design problem scales as the cube of the number of filter coefficients using the direct covariance matrix inversion method. Iterative methods can be devised to avoid the direct inversion of the covariance matrix, but this only reduces the computational complexity to being proportional to the square of the number of filter coefficients. This again can prove prohibitively computationally costly for large sensor arrays with filter banks with large numbers of so-called "taps" (or coefficients).

Finally, the present art of delay-filter-sum beamforming as disclosed in the '748 patent of Guigné et al. does not address the mathematical and physical analysis of the acquired data set that can be applied prior to applying the filter-sum operation to generate the output image of that method. An exact decomposition of the acquired dataset using fundamental properties of physical and mathematical descriptions of the dataset can be exploited to isolate and selectively remove multiple sources of coherent interference. This capability is essential when the signals of interest are greatly diffused (e.g. non-specular returns) in relation to the dominant sources of coherent interference (e.g. specular returns and ground roll). In the hierarchy of beamforming methods, this approach can be termed a delay-classify-filter-sum beamforming method.

DETAILED DESCRIPTION

Data Acquisition

Figure 1:
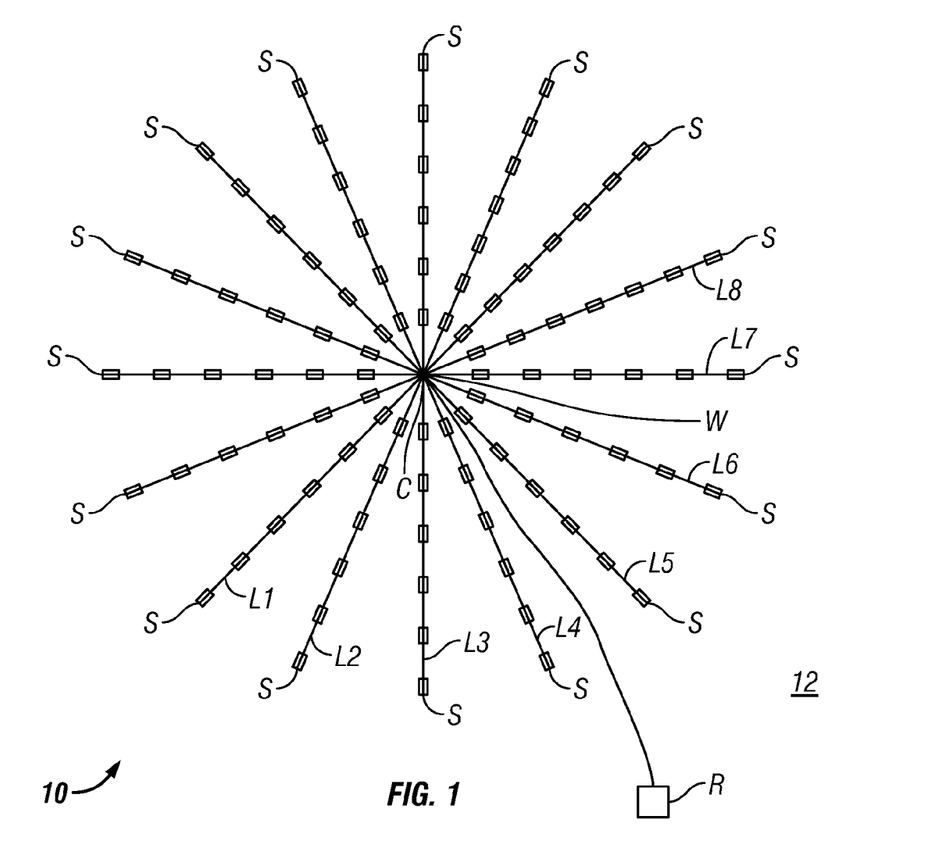
FIG. 1 shows an example of acquisition of seismic signals that may be processed according to example embodiments according to the present disclosure.

An example seismic sensor array that may be used with the invention is shown schematically at 10 in FIG. 1. In the example shown in FIG. 1, the seismic sensor array 10 may be disposed on the surface for land-based applications of the method or on the bottom of a body of water 12 such as a lake or the ocean for marine-based applications of the method. The seismic sensor array 10 may include individual seismic sensor cables L1 through L8. The cables L1 through L8 may include a plurality of spaced apart seismic sensor modules S disposed along the length of each seismic sensor cable L1-L8. Each of the seismic sensor modules S may include a so-called "four-component" seismic sensor (not shown separately). "Four-component" seismic sensors typically include three, orthogonally oriented particle motion responsive sensors such as geophones or accelerometers, and a substantially collocated pressure or pressure time gradient responsive sensor such as a hydrophone. See, for example, U.S. Pat. No. 5,774,417 issued to Corrigan et al. for an example of such four component seismic sensors used in a sensor cable for deployment on the bottom of a body of water. Examples of the longitudinal spacing between sensor modules and the number of the sensor modules S on each seismic sensor cable L1-L8 will be further explained below with reference to FIG. 2. Each seismic sensor (not shown separately) in each sensor module S may generate electrical and/or optical signals related to the parameter being measured (e.g., velocity, acceleration, pressure or pressure time gradient). The sensor signals may be communicated according to the type of sensor output signal to a recording unit R. The recording unit R may be disposed on the water bottom, or in a buoy near the water surface for signal record storage and later retrieval.

A seismic energy source W, which may be an air gun array or water gun array, or other suitable sources, such as magnetostrictive or piezoelectric transducers may be disposed proximate the center C of the sensor array 10. The source W is actuated at selected times, and a time indexed record of the signals produced by each sensor in each module S can be recorded in the recording unit R for later analysis. Particular characteristics of the seismic energy source W will be further explained below.

The seismic sensor cables L1-L8 may be arranged in a radial pattern as shown in FIG. 1. The seismic sensor cables L1-L8 in the present example may be symmetrically arranged about the center point C of the array 10 and angularly displaced from each other by an angle of about 22½ degrees. In other examples, fewer or more cables may be used than is shown in FIG. 1. It is contemplated that in such other examples the angular displacement between each of the cables will be approximately equal, however equal angular displacement between sensor cables is not a limit on the scope of the present invention. The radial sensor cable arrangement shown in FIG. 1 may be advantageous in calculated beam steering of the sensor response. However, other geometric arrangements may be used that can be beam steered according to the invention.

Figure 1A:
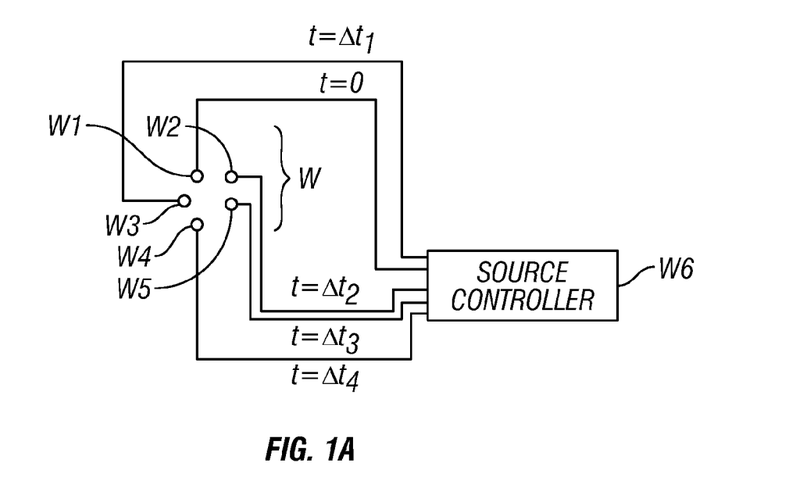
FIG. 1A shows an example source array.

FIG. 1A shows an example of the seismic energy source W in more detail. The source W may consist of a plurality of individual air guns or water guns or other suitable seismic energy sources such as explained above, shown at W1 through W5 arranged in a small-diameter, generally circular pattern. The individual sources W1-W5 may be actuated by a source controller W6, which may be in operative communication with the recording unit (R in FIG. 1) so that the signal recordings may be time indexed to the actuation time of the source W. In the present example, the source controller W6 may be configured to successively, individually (or in subsets or subcombinations) actuate each source W1-W5 at a selected time delay (which may be zero or any other selected time delay) after the actuation of the first one of the sources W1-W5. The time delay may be selected such that the energy output of the array of sources W1-W5 is oriented substantially along a selected direction. In such examples, the directivity of the source W may be used to further illuminate subsurface features identified during signal processing or otherwise. Such specific illumination will be further explained below with reference to FIG. 3.

A longitudinal spacing between seismic sensor modules on each sensor cable, and a number of such seismic sensor modules on each cable may be determined by the frequency range over which a seismic analysis of the subsurface rock formations is to be performed. Such seismic frequencies, of course, must have been radiated by the seismic energy source. Selection of suitable frequency for the seismic energy source will be explained in more detail below. The longitudinal spacing between seismic sensor modules forming the receiver array is preferably selected such that for a particular seismic frequency the spacing should not be greater than about one-half the seismic energy wavelength. At each frequency an example cable length may be about 80 to 120 wavelengths of the longest wavelength seismic energy frequency. Thus, it is possible to use an array having sensor cables of overall length 120 wavelengths at the lowest frequency, but variable longitudinal spacing along each cable between the seismic sensor modules, so that the overall array will include 120 wavelength-long sensor arrays at higher frequencies with a half-wavelength spacing at such higher frequencies. The sound speed (seismic velocity) used to determine the wavelength is that within the rock formations near the water bottom (or the Earth's surface in land based surveys).

Figure 2:
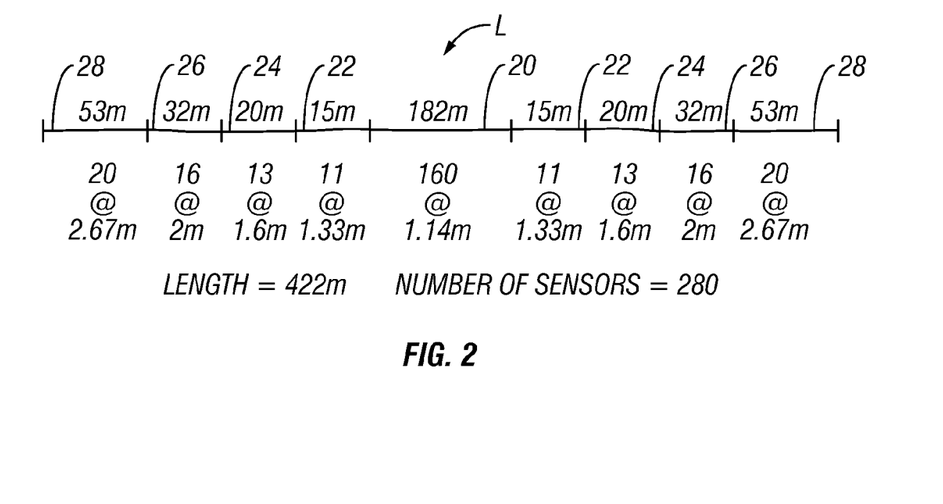
FIG. 2 shows example spacings of sensors along a line thereof as in FIG. 1.

An example of possible longitudinal spacing between seismic sensor modules (S in FIG. 1) and numbers of such seismic sensor modules is shown schematically in FIG. 2. The seismic sensor modules (S in FIG. 1) may be more closely spaced along each cable L nearest the center point (C in FIG. 1) of the array (10 in FIG. 1), becoming more sparsely spaced toward the longitudinal end of each cable L. In the example shown in FIG. 2, a centermost portion 10 of the cable L can be about 182 meters long and have 160 sensor modules spaced apart from each other by about 1.14 meters. Laterally adjacent on either end of the centermost portion 20, a first lateral portion 22 may include 11 sensor modules spaced apart from each other by about 1.33 meters and have an overall length of about 15 meters. A second lateral portion 24 may be disposed laterally adjacent each first portion 22 and have 13 sensor modules spaced about 1.6 meters from each other and have overall length of about 20 meters. Respective third 26 and fourth 28 lateral portions may be adjacent as shown in FIG. 2 and include, respectively, 16 and 20 sensor modules spaced apart by 2 and 2.67 meters, and have overall length of 32 and 53 meters. Overall, each cable L in the array (10 in FIG. 1) may include 280 sensor modules and have length of about 422 meters. Other lengths and sensor module spacings may be used. It is contemplated that the sensor module spacing in the present example, when used in conjunction with a seismic energy source (W in FIG. 1) having substantial energy in a frequency range of about 300 to 700 Hz, will provide high resolution images at depths below the water bottom of 1 to 3 kilometers. The lateral resolution of the measurements made by the array will increase as the length and the number of sensor modules on each cable L is increased. Vertical resolution of the measurements made by the array is related to the frequency content of the seismic energy.

Figure 3:
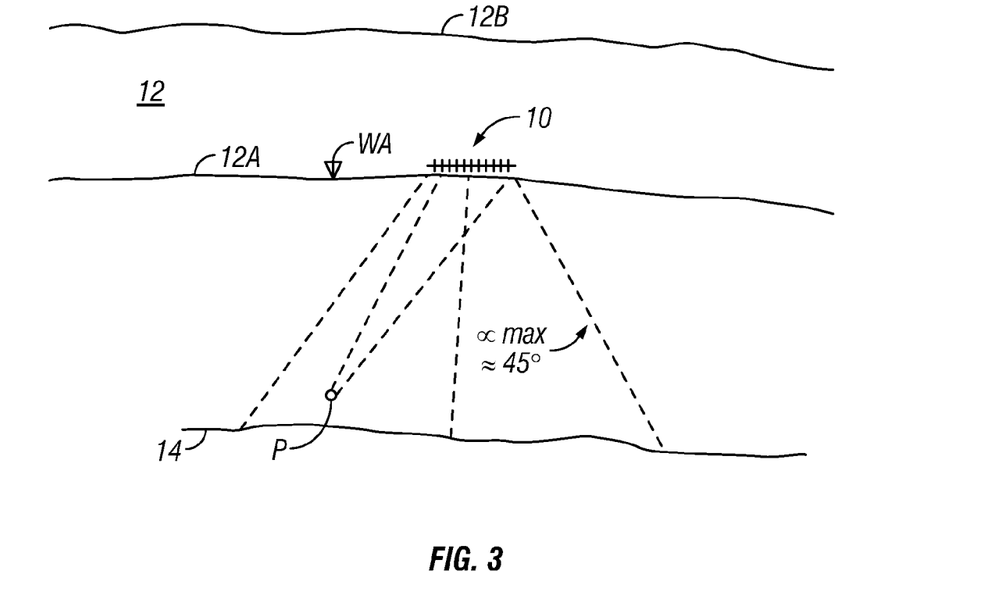
FIG. 3 shows an example aperture of an array such as shown in FIG. 1 and an auxiliary source disposed vertically over an image point in the subsurface.

Referring to FIG. 3, the sensor array 10 is shown disposed on the bottom 12A of the body of water 12. The water top is shown at 12B. Methods according to the present disclosure may provide increased resolution images of subsurface formations, such as shown at 14, and may provide the capability to image within an aperture defined by an angle shown at α in FIG. 3. High resolution images may be obtained from 0 degrees through to angles of 45 degrees or more using methods of the present invention. In some embodiments, an auxiliary or additional seismic energy source WA may be positioned substantially directly over each selected image point P in the subsurface, and the energy from the auxiliary source WA may be used to assist in calibration of a model of distribution of acoustic properties of the formations in the subsurface. Two way travel times measured using such an auxiliary source provides the means of determining travel time errors caused by refractive effects of layers of the formation having different acoustic properties.

In methods according to the present disclosure, the seismic energy source (W in FIG. 1) may be of a type to provide substantially higher frequency energy than is used in conventional reflection seismic surveys. As will be explained below, in methods according to the invention the fact that the source W and the array 10 are stationary provides that the source W may be actuated repeatedly so that random incoherent higher frequency energy unrelated to the subsurface formations may be attenuated by summing or stacking signals from the repeated actuations.

In selecting a frequency output for the seismic energy source (W in FIG. 1) the following may be considered. A reasonable expectation for attenuation of the seismic energy as it moves through the rock formations would be about 0.1 dB attenuation per wavelength of the seismic energy as is emanates from the source (W in FIG. 1). Table 1 shows a relationship between seismic energy attenuation and center frequency of the seismic energy, and provides guidance as to how much signal gain may be required at higher frequencies in order to have similar reflection signal strength as that of a conventional seismic survey. Conventional seismic surveys typically have at most about 120 Hz center frequency seismic energy, although in practice a more common center frequency range is about 50 to 80 Hz. The attenuation to 1000 m depth below the Earth's surface (or the water bottom) for a seismic energy velocity of 3000 meters per second can be calculated as (2*1000*120/3000)*0.1=8 dB. To a depth of 3500 m the corresponding attenuation is about 28 dB.

seismic energy, as suggested above. Attenuation may be quantified in dB attenuation per wavelength of energy travel. It is known in the art that satisfactory seismic survey results may be obtained when the attenuation is between about 0.1 and 0.16 dB per wavelength. The seismic signal returned to the receivers (sensors) must be sufficiently high amplitude above the ambient incoherent noise described above, for example about 10 dB above the noise, for the seismic signals to be useful for subsurface evaluation. The foregoing relationship between the seismic signal amplitude and the ambient noise is termed the signal to noise ratio and it is related to the seismic energy source strength, the attenuation, the seismic energy center frequency, the seismic energy bandwidth around the center frequency, the geometrical spreading loss, the number of receiving sensors and the prevailing ambient noise. The systematic lowering of the incoherent noise by the method of vertical stacking described above allows increasingly weaker seismic signals to be analyzed that can be associated with increasingly finer details in the subsurface.

The foregoing description of seismic energy sources is made in terms of impulsive type energy sources commonly used in marine seismic surveying. It should be clearly understood that methods according to the present disclosure are equally applicable to signals acquired using vibrator-type seismic energy sources. When using vibrator type sources, each such source may be operated through a plurality of "sweeps" or "chirps" that include the range of frequencies of interest determined as explained above. Processing of the signals recorded by a plurality of actuations of vibrator type souces may be performed using techniques known in the art.

Example methods according to the present disclosure were tested through a full-scale proof-of-concept pilot. The pilot sensor array comprised over 4000 single-component seismic sensors deployed in in sixteen lines, wherein the lines were angularly spaced at ~22.5° increments in a star-shaped geometry. The array of sensors covered about 12.5 km$^2$. The sensors detected and signals recorded from the sensors included frequencies from 5 to 170 Hz. Beam steering of the sensor array was performed so that the main

TABLE 1

| Freq. Hz | Wave-length (m) | Two way Attenuation to 1000 m (dB) | Two way Attenuation to 2000 m (dB) | Two way Attenuation to 3500 m (dB) | Gain needed for focused survey over conventional seismic survey (dB) | | |
|---|---|---|---|---|---|---|---|
| | | | | | 1000 m (7 dB spreading gain) | 2000 m (4 dB spreading gain) | 3500 m (2 dB spreading gain) |
| 120 | 25 | 8 | 16 | 28 | | | |
| 200 | 15 | 13 | 26 | 46 | −2 | 6 | 16 |
| 300 | 10 | 20 | 40 | 70 | 5 | 20 | 40 |
| 400 | 7.5 | 27 | 54 | 94 | 12 | 34 | 64 |
| 500 | 6 | 33 | 66 | 115 | 18 | 46 | 85 |
| 600 | 5 | 40 | 80 | 140 | 25 | 60 | 110 |
| 700 | 4.3 | 47 | 94 | 164 | 32 | 74 | 134 |

The purpose of selecting a range of frequencies which is higher than that used for conventional seismic surveys, is to increase the vertical resolution and to maintain or increase the lateral resolution of the resulting seismic data while benefiting from the practical aspects of physically smaller sensor array apertures. Choosing a range of frequencies for which seismic data from various depths down to 3500 m and beyond can be obtained requires consideration of a number of factors. Of great importance is the attenuation rate of the lobe beam-width at −3 dB was 0.5°, with side lobes at −15 dB below the main lobe. 512 sweeps were generated and vertically stacked for each of five vibrator seismic sources at selected locations for a total of 2560 vibrator source sweeps. Ground preparation entailed removal of loose topsoil for a good coupling medium for the vibrators.

The ambient noise floor was measured below −45 dB at maximum fold assuming a flat ("white") noise power spectrum. The exponentially decaying power spectrum is estimated as >99.99% coherent. Spectral whitening was applied to the vertically-stacked sensor recordings to flatten the high frequency content of the acquired data set. See, for example, Lee, M. W. (1986) "Spectral Whitening in the Frequency Domain", Open-File Report 86-108, U.S. Geological Survey.

Otherwise, the processing workflow is similar to conventional seismic processing, with corrections for elevation statics, refraction statics, and muting of noisy traces. For the pilot study, a two-parameter velocity model in time-migration format was used from a prior 3D reflection seismic study of the same image volume.

The strong emphasis on data collection requirements is key to enabling the method of the present disclosure. The use of a stationary sensor array configuration yields excellent signal fidelity prior to imaging. Early common-receiver (vertical) stacking gains from multiple shots at each vibrator location lowers the incoherent, uncorrelated, noise floor over a broad frequency spectrum, including higher frequencies at depth. In this way, a high signal/noise ratio is established prior to imaging, enabling subsequent beam-forming and spectral balancing.

Unlike conventional seismic processing approaches, the incoherent noise that contaminates the spectral whitening output in conventional seismic is very strongly suppressed by design in the method of the present disclosure. This ensures that the high frequency content at depth, although attenuated, is still very much greater than the underlying incoherent noise floor.

Generic Beamformer Model

The spatial response of the sensor array can be localized to a small volume within the subsurface, with its location of the volume dependent on the propagation of acoustic waves in the subsurface and the underlying velocity distribution on which this propagation depends. The quality of the resulting image improves with increased understanding of the underlying velocity distribution, following an iterative process using self-consistency as a guiding principle (this being the same process used in conventional seismic processing).

The observation point, or focal point of the beam steering, x, may be assigned coordinates as (x, y, z) or (x, y, t) in the same fashion as conventional 3D seismic processing, depending on whether the beamforming method is applied in "pre-stack depth migration" (PSDM) or "pre-stack time migration" (PSTM) coordinates. Either depth z or two-way travel-time t may be used to measure position within the subsurface. The travel-times may be determined by ray-tracing through an interval velocity subsurface model in a PSDM application of the present method or determined using travel-time equations arising from effective medium theory with a root-mean-square (rms) velocity model in a PSTM application of the present method. In the present description of the beamforming method, PSTM coordinates are used.

Mathematically, the output of a phased array according to the method of the Guigné et al. '748 patent referred to herein in the Background section may be formulated as the weighted sum of complex signals described by the following matrix equation:

$$y(x) = W^H u \qquad (1)$$

where u represents the acquired data set (each column of u consists of one seismic trace as recorded for each source-receiver pairing), and $w^H$ is the hermitian transpose of a column vector of beamforming weights that implement the spatial filter. This beamforming equation may be expressed in either the time domain or frequency domain, with either representation related to the other representation via the Fourier transform. More generally, each received signal may be multiplied by a complex weight whose real (amplitude and/or gain) and imaginary (phase and/or time delay) parts may be specified before being summed. It is the complex weight multiplication operation that modifies the spatial response of the sensor array. It is this operation that is mathematically equivalent to a filter operation.

Different beam forming approaches correspond to different choices for the weighting vector w.

For some beamformers, the weights are deterministic; i.e., a formula exists by which the weights may be calculated. For other beamformers, the weights may be determined through an optimization process according to a specific objective; e.g., to maximize or minimize a cost function or power spectrum. The power of the beamformed output is given by (recall N is the number of time samples in a single trace) the expression:

$$P(w) = w^H \hat{r}_{uu} w = \frac{1}{N} w^H \hat{R}_{UU} w \qquad (2)$$

The beamformer weights are "spatial" filter coefficients. In time-migration coordinates, the two-way travel-time axis is considered a pseudo-space axis. When the sensor array is tuned to focus on a particular two-way travel time for each sensor corresponding to travel time of seismic energy from the source to an image point and back to each seismic sensor, then the response of the sensor array is being maximized for a particular subsurface point (i.e., the "image point") that corresponds to energy being reflected and/or scattered from that subsurface point.

A generic beamformer may be defined as a multi-stage delay and filter architecture. The first stage is the time delay for each source-receiver pair that synchronizes the arrival times of a signal scattered from a selected image point in the subsurface.

If the time-delayed signal is simply summed (i.e., the filter weights for each summed sensor signal are equal), the output is a simple delay and sum beamformer (also known as a Bartlett beamformer). This type of beamformer maximizes the signal in a particular direction or in a particular image volume element (voxel).

When the time-delayed signal from each sensor is multiplied by corresponding filter weights and then summed, then the type of filter weights chosen will further define the beamformer. In the present method, when the filter coefficients are defined at a particular "time" (i.e. the appropriately delayed times from the delay stage), the filter is a spatial filter.

If the weights are chosen to minimize the output power from interference outside the observation direction while maintaining the signal gain in the observation direction, then the beamformer is called a minimum variance, distortionless filter (also known as a Capon beamformer).

If additional stages of filtering are added for (J-1) prior "time" steps, then a finite impulse response (FIR) filter with J filter-taps may be applied to each time-delayed sensor signal and then summed. This is a delay-filter-sum beamformer, or Frost beamformer. By creating a filter bank for the signals detected by each seismic sensor, both the spatial and frequency response can be shaped.

In the method described by Guigné et al. in the above referenced patent, additional stages of filtering added by the Frost beamformer architecture correspond to adding additional stages of spatial filters that now correspond to the spatial dimension (i.e. depth). This means that, for geophysical imaging applications, additional filter stages can be both advanced or delayed relative to the "time" (or depth point) being imaged. The filter coefficients can now be applied to a spatial volume around the imaging point. This is a non-local filter.

Data Model Decomposition

In the present disclosure, the acquired data set may be exactly decomposed into constituent data sets according to a plurality of predefined criteria, such that:

$$u = u_1 + u_2 + \ldots + u_K + \Delta u = \Sigma_{k=1}^{K} u_k = \Delta u, \quad (3)$$

where the $u_k$ are the "components" of the total data set classified according to a particular predefined criterion and $\Delta u$ is the "remainder" of the data set that remains unclassified by the procedure that will be described in detail below.

In the present disclosure, each component data set may be defined according to the physics of the underlying process to be imaged; i.e. the method described is a physical decomposition of the data set. This is in contrast to a mathematical decomposition of the dataset, such as would be performed through singular value decomposition (or SVD), for example. It will be shown below that an exact physical decomposition of the data set may also be expressed in terms of an exact mathematical decomposition of the same data set.

The physical property of interest in the method described below is the distinction between the desired signal, potentially multiple sources of coherent interference, and everything else that is not otherwise classified (note that the method of Guigné et al includes essentially complete suppression of incoherent noise through multiple shots and common-receiver, or vertical, stacking) In the literature of phased array signal processing research, this decomposition is known as a data model (see, Krim H. and Viberg M., "Two Decades of Array Signal Processing Research," IEEE Signal Processing Magazine, 1996) and the "geometrical" properties of the data model are used to enhance the extraction of signals of interest and reject sources of interference.

Imaging "Secondary" Sources

The present disclosure images so-called "secondary" sources that arise from interaction of acoustic waves with the existing geology (i.e., the acoustic properties of the formations) in the subsurface.

At an observation (i.e., image or focal) point, energy is returned to the seismic sensors only if there is an interaction that reflects (specular) or scatters (non-specular) the acoustic energy imparted by the source (FIG. 1A). Any energy detected by the sensors may be modeled as being due to a "secondary source" at the image or focal point.

The detailed response of the Earth to incident acoustic energy at the image point gives rise to a radiation pattern for the energy that is returned to and is detected by the sensors (FIG. 1). It is this radiation pattern that is observable over the measurement surface (i.e., the specific geometric pattern of the sensor array). The radiation pattern is the signature of the unknown geologic processes that transform a known input wave field (from the acoustic source, FIG. 1A) into a known output wave field (the observed signals detected and recorded by the sensor array).

The unknown geologic process will modify the amplitudes and phases of every frequency component of the incident wave field. Reconstructing this underlying geologic process may be dependent on a discrete number of component subprocesses that are simpler to model, characterize (express in terms of data model parameters), and measure (obtain parameter values for the observed data).

The present disclosure provides a systematic method by which an arbitrary radiation pattern may be expanded in terms of component radiation patterns that are simpler to characterize. The present example method may include systematically constructing an "image template" (or component data model) that characterizes one or more component radiation patterns and then "projects" the observed "data image" onto the component image template to determine the magnitude of agreement between the observed data and a component data model.

Pre-Processing of Trace Data

Prior to applying the data processing methods below, one could optionally apply several pre-processing steps on the trace data, analogously with conventional 3D seismic processing. This can include muting of noisy traces (e.g. traces where no signals can be extracted), suppression of time windows of trace data (e.g. time windows corresponding to strong air-wave signals), or optional digital signal processing steps (e.g. bandpass filters, spectral whitening).

Travel-Time Calculations

Accurate travel-time calculations are fundamental to imaging the subsurface, both for 3D seismic (time and depth migrations) and for the present method. Imaging specular energy in 3D seismic appears to require travel time accuracies of about 1%, which is achievable with hyperbolic moveout equations and a widely used non-hyperbolic equations (see Alkhalifah T. and Tsvankin I "Velocity analysis for transversely isotropic media," Geophysics, Vol. 60, 1995).

As the frequency content of the source output ("wavelet") includes increasingly higher frequencies, the wavelet increasingly becomes more like a delta-function, and imaging these delta-functions at depth becomes increasingly sensitive to very small systematic errors in the travel-time calculations (either based on moveout equations or wave-equation based ray solvers).

Coherent summations of high frequency data in the present method is sensitive to systematic errors in the travel-time equations on the order of 0.1% or less, an order of magnitude or more over the requirements of conventional 3D seismic. At this level, the travel-times become increasingly sensitive to velocity anisotropy, e.g., Thomsen parameters that are conventionally ignored or approximated (the eta ($\eta$) parameter of Alkhalifah-Tsvankin (1995) approximating the dependence of travel-times on the difference between the epsilon ($\epsilon$) and delta ($\delta$) parameters of Thomsen).

One can extend the present method by devising travel-time equations less sensitive to these approximations, necessitating the introduction of more material parameters within a given model (e.g. the vertically transversely isotropic [VTI] model has up to 5 parameters) or more accurate underlying structural models for the subsurface with more complex symmetries (e.g. tilted transversely isotropic TTI and horizontal transversely isotropic HTI models).

The increased accuracy of the travel-time expressions comes at increased cost of computation and increased numbers of parameters to be determined. In the present method and seismic processing methods in general, it may be observed that high frequencies present in the data are attenuated by systematic errors introduced by approximations of the underlying material parameters and the travel-time equations that depend on these parameters. The present method may use acoustic theory at a higher level of accuracy than conventional methods to exploit the higher frequency content of the acquired seismic signal data (see, for example, Fomel S., "On anelliptic approximations for qP velocities in VTI media," Geophysical Prospecting, Vol. 52, 2004).

Forward Transform (Time-Delays) of Scanline Gathers

One may define the data set $u=u(x_r, x_s, t)$ as consisting of traces defined over time t for each source-sensor pair as a function of source and sensor position $x_s$ and $x_r$ respectively. Similarly, one may define $u_{cdp}(x_r, x_s, \tau_s+\tau_r)$ at a common-depth-point (CDP) to correspond to the original (or optionally pre-processed) recorded time-domain trace data evaluated by interpolating individual traces for each source-sensor pair at a time equal to the total travel-time from the source to the image point and back to the sensor: $\tau_s+\tau_r$. The total travel-time may be calculated using the travel time equations appropriate to the underlying acoustic interaction being evaluated, generally either a reflection or a diffraction.

Optionally, a band-limited rho filter may be applied to each interpolated trace to "differentiate" the trace prior to applying a filter-and-sum operation over the spatial domain. In tomography, this operation has the effect of undoing the "blurring" of the image due to the low-pass filtering arising from the spatial summation. In image processing, this operation is a sharpening, or edge detection, operation.

A set of interpolated trace values for every source-sensor pair in the array aperture may be referred to herein as a "scanline" gather. In the present method, a scanline is defined relative to a position such as a common depth point $(x_{cdp}, y_{cdp})$ on the measurement surface where each depth point in the scanline differs only in terms of the two-way time migration coordinate $t_{0,i}$. If a hypothetical source of acoustic energy were placed at $(x_{cdp}, y_{cdp})$, then all the image points along a scanline would be coincident with a hypothetical zero offset ray connecting all image points along the scanline.

If each trace in time migration coordinates is designated by $t_{0,i}$ where i ranges from 1 to M for each image point, for a given image point, then a flattened scanline gather can be represented by the expression:

$$\{u_{cdp}(x_r, x_s, \tau_s(t_{0,i}) + \tau_r(t_{0,i}))\} = \begin{Bmatrix} u_{cdp,1}(t_{0,1}) \\ u_{cdp,2}(t_{0,2}) \\ \vdots \\ u_{cdp,M}(t_{0,M}) \end{Bmatrix}, \quad (4)$$

where the shorthand notation is used:

$$u_{cdp,i}(t_{0,1}) = u_{cdp,i}(x_r, x_s, \tau_s(\tau_{0,i}) + \tau_r(t_{0,i})). \quad (5)$$

$u_{cpi,i}(t_{0,1})$ is a row vector of length $N_t = N_s \times N_r$ with the interpolated trace values for each of $N_t$ source-receiver pairs, $N_s$, $N_r$ are the number of sources and sensors, respectively, and $t_{0,i}$, is the i-th zero-offset two-way travel-time for a given common depth point (CDP).

Optionally, a rho filter may also be applied after the final filter-and-sum beamforming operation over space, after the image values for each voxel have been computed. Images can also be generated without applying the rho filter.

Template Processing of Data Gathers

The data processing for the present disclosure proceeds prior to applying the spatial filtering and beamforming disclosed in the system and method of Guigné et al.

In conventional seismic processing, the Radon transform (e.g., slant-stack or tau-P transforms, for example) can be used as a means of separating coherent interference from the desired signals of interest. Exactly invertible Radon transforms are used in reflection seismic data processing to concentrate and separate the received seismic energy caused by coherent interference from the received seismic energy resulting from the signals being sought. The energy of the coherent interference is then muted to subtract the energy due to interference along with any coherent signal within the mute. The muted transformed data is then inverted back to the original data domain (e.g., the time-space domain) for subsequent processing.

In the present disclosure, a full Radon transform is not computed. Rather, the original data set undergoes a coordinate transformation into a "reference frame" wherein the desired signal (or desired component of interference) has a particularly simple (e.g., linear) form which, in geophysics, is called a "flattened" gather of data. The equation that defines this coordinate transformation is known in geophysics as the normal moveout (NMO) equation, which is employed to calculate the time delays that flatten the individual trace returns for the signals of interest in the gather of data.

The time-delayed gather of data may then be exactly classified as either consistent with (or parallel to) a template for the signal (or component of interference) or not consistent with (or perpendicular to) the same template. This is the projection operation of the present disclosure, which is dependent on defining an appropriate mathematical operation equivalent to a scalar product (or projection) operator applied between a pre-defined template unique to an underlying geophysics of interest and the recorded data set.

In the art of image processing, the method of the present disclosure is similar to that of a Hough transform (which outputs parameters for lines and/or circles in images, for example), which shares many properties with Radon transforms. The output is a parameter that is proportional to the agreement between the data image and the template image, extended to patterns for seismic energy interactions such as reflections and diffractions.

By time-stepping (alternatively, depth-stepping or offset-stepping) the template through a selected gather of data, the set of parameters obtained by all comparisons of the data with the template allows the original data set to be exactly decomposed into a pair of consistent/inconsistent (or parallel/antiparallel) data sets. The sum of these two data sets is the original data set prior to this classification (or decomposition).

A method according to the present disclosure then proceeds to analyze the desired data set (preferentially the desired signal) or continue the classification to further isolate desired signals from additional sources of undesired coherent interference.

Adaptive Processing of Scanline Gathers

In methods according to the present disclosure the template with respect to depth, offset, or time (or combinations thereof) may be changed to adaptively characterize the data in terms of the underlying template. In geophysical processing, for example, there is a need to accommodate the frequency-dependent attenuation of the acoustic wavelet with time (or depth), which causes the wavelet to broaden due to the increased suppression of high frequencies over low frequencies.

In methods according to the present disclosure, all eigenstructure-based classification and filtering methods may be adapted for each individual image point. This adaptive processing allows the method to include more realistic models of propagating wavefields, including frequency attenuation of the source wavelet, for example.

The method of the present disclosure processes data in time along the "virtual zero offset ray" for each common depth point (CDP) on the surface. For each image point in the subsurface, the CDP on the surface corresponds to the minimum travel-time from source to receiver as the offset between them goes to zero.

One may define an arbitrary moveout equation as a function that maps times as t→τ, namely $$\tau = \tau(t; q), \quad (6)$$

where q denotes the set of all parameters of the moveout equation (e.g., NMO velocity, Thomsen parameters, etc.). The inverse exists as:

$$t = t(\tau; q). \quad (7)$$

A "flattened" time-delayed scanline gather may be defined by the function $\mathcal{R}$ that transforms one data set into another; namely:

$$\bar{u}(x_r, x_s, \tau) = \mathcal{R}\{u\} = \delta(\tau(t; q) - t) * u(x_r, x_s, t). \quad (8)$$

In Eq. 8, $\delta(\tau(t; q) - t)$ is a delta function operator and $*$ denotes convolution. In practice, each trace is discretely sampled in time and the implementation of the above convolution simply denotes an interpolation operation in time. It is known in the art of signal processing that this interpolation operation may be rendered exact and invertible for band-limited data. We can therefore define the inverse function $\mathcal{R}^{-1}$ via the expression $$u(x_r, x_s, t) = \mathcal{R}^{-1}\{\bar{u}\} = \delta(t(\tau; q) - \tau) * \bar{u}(x_r, x_s, \tau). \quad (9)$$

Once a dataset is time-delayed according to a given moveout equation, an exact decomposition of the dataset is performed using a projection function P that performs the following operation:

$$\bar{u} = \bar{u}_\| + \bar{u}_\perp = P\{\bar{u}\} + (\bar{u} - P\{\bar{u}\}), \quad (10)$$

where $\bar{u}_\| = P\{\bar{u}\}$ and $\bar{u}_\perp = \bar{u} - P\{\bar{u}\}$. A property of the projection function P is the requirement that $$P^2 = P\{P\{\ldots\}\} = P\{\ldots\} = P. \quad (11)$$

In the present disclosure, the projection function may be adaptive in time. The projection function defines a data set that is consistent with a particular "classification" of the type of energy in the data (e.g., ground roll, reflection, diffraction, etc.) based on the moveout equation and a particular "signature" of the wavefield as it would be recorded at each individual sensor on the surface. The signature of the wavefield as recorded on the surface may be defined as being non-local in time, necessitating the projection function applied to a data set to be defined in terms of projection operations defined on sliding time windows in the data set.

Defining the Analyzing Wavelet Template

The true amplitudes of the radiation pattern at each sensor in the array may be realized as a template for the observed data that is proportional to one or more parameters that characterize the signature of the unknown geologic process that is being imaged.

For any particular acoustic interaction process being imaged, a unique Green function may be defined. The Green function definition is model-dependent (as reflected in the wave equation and the material model) and is subject to boundary conditions. Both the model and the boundary conditions for the model may be considered as quantities to be determined.

One may define an "analyzing wavelet template" as the outer product of a wavelet $\vec{w}$ defined over a selected time window and a complete set $\vec{g}$ of amplitudes (the method can also be extended to include phases) defined over the spatial dimensions of the sensor array. These amplitudes may be predicted based on a complete wavefield analysis based on Green functions, resulting in a radiation pattern that is captured as true amplitudes (and potentially phases) in $\vec{g}$. One may then define the analyzing wavelet image W as the outer product:

$$W = \vec{w} \otimes \vec{g} = \vec{w}\vec{g}^T. \quad (12)$$

If $\vec{g}$ is M×1 and $\vec{w}$ is L×1, then W is L×M. Both $\vec{g}$ and $\vec{w}$ may be normalized so that $$\vec{g} \cdot \vec{g} = 1,$$

$$\vec{w} \cdot \vec{w} = 1. \quad (13)$$

With this normalization, one may define a scalar product so that the analyzing wavelet template satisfies the normalization condition $$W \cdot W = \text{trace}(W^T W) = \text{trace}(WW^T) = 1. \quad (14)$$

Singular Value Decomposition

Any M×N matrix A whose number of rows M is greater than or equal to its number of columns N, can be written as the product of an M×N column-orthogonal matrix U, an N×N diagonal matrix Σ with positive or zero elements, and the transpose of an N×N orthogonal matrix V:

$$A = U\Sigma V^T. \quad (15)$$

The purpose of SVD in the present method is that it explicitly constructs orthonormal bases for the null space and range of the matrix A: the columns of U whose same-numbered elements $\sigma_i$ are non-zero are an orthonormal set of basis vectors that span the range; and the columns of V whose same-numbered elements $\sigma_j$ are zero are an orthonormal basis for the null space. The relationship between SVD and the covariance matrix approach lies in the observation that the columns of U are the eigenvectors of the M×M matrix"

$$\Gamma = AA^T, \quad (16)$$

which, apart from a normalization factor 1/N, is the positive semi-definite covariance matrix (this matrix may also be interpreted as a correlation matrix).

Subspace methods that leverage the eigen-structure of the covariance matrix are based on the decomposition of covariance matrices into signal and noise subspaces which correspond to the range and null-spaces defined above for SVD. In the present method, SVD allows evaluating the matrix A as a sum of matrices:

$$A = \sum_{m=1}^{M} \sigma_m Q_m = \sum_{m=1}^{M} \sigma_m \vec{u}_m \vec{v}_m^T, \quad (17)$$

where the $Q_m$ are called eigen-images (or KL modes) defined in terms of outer-products of the eigenvectors $\vec{u}_m$, $\vec{v}_m^T$ of U, $V^T$ respectively. This decomposition in eigen-images is equivalent to the KL expansion:

$$A = U\Psi \quad (18)$$

where $\Psi = \Sigma V^T = U^T A$ is the Karhunen-Loeve transform (KLT) of the data matrix A.

The eigenvalues $\lambda_m$ of the covariance (or correlation) matrix Γ may be interpreted as the "energy" of the m-th eigen-vector $\vec{u}_m$. The relative energy $E_m$ of the m-th KL expansion is defined as:

$$E_m = \frac{\lambda_m}{\sum_{i=1}^{M} \lambda_i} = \frac{\sigma_M^2}{\sum_{i=1}^{M} \sigma_i^2}. \quad (19)$$

The value $\sigma_m^2$ in Eq. 18 is the variance of the m-th KL mode.

The eigen-image decomposition (or KL expansion) is "optimal" in the sense that, if one forms the matrix $A_k$ by keeping the first k eigen-images in the eigen-image expansion, or $$A_k = \sum_{m=1}^{k} \sigma_m Q_m, \qquad (20)$$

then $A_k$ represents a best approximation to A by a matrix of rank k<M in the Frobenius norm (the square root of the sum of the squares of all the matrix elements).

In terms of matrix elements of A, the SVD of A may be given by the weighted sum of outer products of the columns of U and the rows of $V^T$, or:

$$A_{ij} = \sum_{m=1}^{M} \sigma_m U_{im} V_{jm}. \qquad (21)$$

The eigen-images themselves are orthonormal in the sense that the dot-product of eigenimages may be defined so that $$Q_i \cdot Q_j = \text{trace}(Q_i^T Q_j) = \delta_{ij}. \qquad (22)$$

SVD can be applied to any "matrix" of data (e.g. a time-window of diffraction gather data). The SVD is an exact mathematical decomposition of the data in terms of eigenvalues (energy) and eigenvectors. Bilinear combinations of the eigenvectors create eigen-images. Eigen-images support an algebra that includes a scalar product. The existence of a scalar product allows eigen-images to be projected onto template-images (e.g. templates of patterns being sought in the data). These projections are "locally" meaningful if the subspaces spanned by the template and the eigen-images are the same. In the present method, this algebra will be used to implement data processing analysis for extracting non-specular geophysical signals from seismic data sets using imaging processing techniques similar to the Hough transform method.

The SVD Projection Algorithm (Hough Transform)

The SVDP projection (SVDP) algorithm performs one processing pass of a more generalized Hough transform of the acquired data set for a given set of parameters q (where q is defined above).

Define a time window of a flattened gather of data as $$A = A(\tau_i) = \begin{bmatrix} \bar{u}(x_r, x_s, \tau_{i-\Delta}) \\ \vdots \\ \bar{u}(x_r, x_s, \tau_i) \\ \vdots \\ \bar{u}(x_r, x_s, \tau_{i+\Delta}) \end{bmatrix}, \qquad (23)$$

where the time window spans times from $\tau_{i-\Delta}, \ldots, \tau_i, \ldots, \tau_{i+\Delta}$ where the width of the time window is $2\Delta+1$. This window of data may be exactly decomposed as a sum of eigen-images using SVD as:

$$A = U\Sigma V^T = \sum_{m=1}^{M} \sigma_m Q_m = \sum_{m=1}^{M} \sigma_m \vec{u}_m \vec{v}_m^T. \qquad (24)$$

The time window of data can be projected onto the analyzing wavelet template to define $$A_\| = \sum_{m=1}^{M} \sigma'_m Q_m = \sum_{m=1}^{M} |\sigma_m W \cdot Q_m| \vec{u}_m \vec{v}_m^T = \sum_{m=1}^{M} |\sigma_m \text{trace}(W^T Q_m)| \vec{u}_m \vec{v}_m^T, \qquad (25)$$

where $W \cdot Q_m = \text{trace}(W^T Q_m)$ is the matrix dot-product of the analyzing wavelet template W with $Q_m = \vec{u}_m \vec{v}_m^T$, the eigen-images of the KL expansion.

The revised eigenvalues represent the components of the KL expansion of the signal space of the time window that are "consistent" with the analyzing template. These are given by:

$$\sigma'_m = |\sigma_m W \cdot Q_m| = |\sigma_m \text{trace}(W^T Q_m)|. \qquad (26)$$

$A_\|$ in Eq. 24 is the component of the SVD decomposition that is "parallel" to W. It follows that the component of A that is non-parallel with W is contained in $A_\perp$ such that $$A = A_\| + A_\perp. \qquad (27)$$

The coherent signal may be partitioned into separate signal subspaces. By construction, the desired projection is contained preferentially in $A_\|$ while the undesired projection is contained preferentially in $A_\perp$. This allows one to separate signal from interference, or interference from signal.

Recognizing that the desired result is the projection function applied to the entire data set, one may define $$\bar{u}_\|(\tau_i) = \delta(\tau_i - t) * A_\|(t) \qquad (28)$$

which represents projecting out the spatial vector component of $A_\|$ corresponding to the central value $T_i$ of the time window.

In this way, a complete projection of the flattened scanline gather can be calculated to define $\bar{u}_\|(\tau_i)$ for all $\tau_i$ where i=1, N. $\bar{u}\perp$ can then be calculated from $\bar{u}_\perp = \bar{u} - \bar{u}_\|$, if desired.

Implementation of the SVDP Algorithm

In a practical implementation of the present method, the desired result is to extract a relatively weak non-specular signal in the presence of a relatively large coherent interfering background due to specular reflections, ground roll, airwaves, etc.

In order to illustrate the practical implementation of the method, consider a model of the acquired signals as $$u = d + r + \Delta u, \qquad (29)$$

where d is the desired non-specular signal (with a template model defined in terms of point diffractions and a double square root moveout equation), r is a relatively high amplitude, coherent interfering signal due to specular reflections (with a template model defined as boundary layers reflecting plane waves according to a normal moveout equation) and $\Delta u$ is everything else that is not otherwise specified (or classified), such as ground roll, for example.

Further, if it is assumed that $$\|\Delta u\|^2 >> \|r\|^2 >> \|d\|^2, \qquad (30)$$

where the ratio $\|\Delta u\|^2/\|r\|^2$ may be 10-20 dB and the ratio $\|r\|^2/\|d\|^2$ may be 15-30 dB or more, then the incoherent noise floor is effectively zero in the method of Guigné et al (−45 dB or more) and the present method suppresses the incoherent noise floor even further. In practical implementations of the method for eliminating ground roll, it has been found that $\Delta u$ is essentially "orthogonal" to both r and d.

One possible implementation is to simply subtract an estimate of the specular energy r from u before attempting to estimate d. As a final processing step a weighted sum of the flattened diffraction gather, one need only calculate $\bar{d}$ as $$\bar{d} = \frac{1}{\alpha} P_{Wd}\{\mathcal{R}_d\{\mathcal{R}_r^{-1}\{u - P_{Wr}\{\mathcal{R}_r\{u\}\}\}\}\}, \qquad (31)$$

where $1-\alpha$ is a fraction that measures how much of d is subtracted from u when the estimate for r is subtracted from u. $W_r$ and $W_d$ denote the analyzing wavelet templates for reflections and diffractions respectively. $\mathcal{R}$ and P are the flattening and projection functions defined above.

The repeated application of forward and inverse time-delays and projection transforms consecutively isolates sources of interference prior to a final isolation of the signal in a flattened gather of data.

A more refined approach may be possible if the specular and non-specular components are modeled and a best fit of the model to the recorded signal data is obtained by a method such as the constrained least mean square algorithm. Constraints such the total energy in the image being conserved may be applied.

Amplitude Weights for Point Diffractions

In the present method, amplitude weights for Kirchhoff diffraction theory may be compared with the analogous weights in the present method. In 3D reflection seismic processing, true amplitude weights are important for amplitude versus offset (AVO) analysis and amplitude versus angle (AVA) analysis, for example. In the present method, true amplitude weights are important for defining the wavelet analysis templates in the classification algorithms that are employed to reject coherent (specular) interference while extracting coherent (non-specular) signal. The underlying theory for determining the amplitudes of radiation patterns for analyzing specular reflection data is provided in Tsvankin, I., "Seismic Signature and Analysis of Reflection Data in Anisotropic Media," 3$^{rd}$ Edition, Geophysical References Series No. 19, Society of Exploration Geophysicists, 2012, Chapter 2.

Exact and approximate integration weights for Kirchhoff diffraction theory are described in, Zhang, Y., Gray, S., Young, J., "Exact and approximate weights for Kirchhoff migration," 70$^{th}$ Annual International Meeting, Society of Exploration Geophysicists (SEG), 2000. In general, the true amplitude weights applicable to the present method may be calculated similarly to, but are not necessarily equal to, the weights calculated for conventional seismic processing. It follows that these different weights are characteristic of the present method. A simple example illustrates this. The determination of exact integration weights depends on the formulation of Kirchhoff migration integrals (for example, the formulation due to Bleistein N., "On the imaging of reflectors in the earth," Geophysics, Vol. 52, No. 7, July 1987) and the integration weights defined as a function of the Beylkin determinant, geometric spreading factors arising from the free-space Green functions, and obliquity factors arising from:

$$|\nabla(\tau_s + \tau_r)|^2 = \frac{2}{v^2(x)}(1 + \cos\psi) = \left[\frac{2\cos\theta}{v(x)}\right]^2 \sim \left[\frac{2}{v} \cdot \frac{t_0}{t}\right]^2, \quad (32)$$

where θ is the reflection angle, equal to half the opening angle ψ between a source ray and a receiver ray at the image point x. The approximate value of the obliquity factor $\cos\theta = t_0/t$ is based on a constant velocity model where $v(x)=v$.

Unfortunately, these weights are not applicable to the present beamforming method. In the present beamforming method, the applicable Green functions share a geometrical spreading factor (~1/r) for sources and receivers. The obliquity factor is generally different since no assumption is made regarding the opening angle between the source-image and image-receiver ray paths.

In the present method, the opening angle between source and sensor rays at the image point in the constant velocity approximation gives the following obliquity factor:

$$\cos\psi = \frac{t_s^2 + t_r^2 - x^2/v^2}{2t_s t_r}, \quad (33)$$

where x is the offset between source and the individual sensor. The scattering model of the present disclosure requires a different obliquity factor than the Kirchhoff diffraction model of conventional migration.

The amplitude weights for the point scattering template for the present disclosure (in the constant velocity model) are then a function of $$|\nabla(\tau_s + \tau_r)|^2 = \frac{1}{v^2} \cdot \frac{1}{t_s t_r} \cdot \left(t^2 - \frac{x^2}{v^2}\right) \neq \left[\frac{2}{v} \cdot \frac{t_0}{t}\right]^2. \quad (34)$$

Note that the term $(t^2-x^2/v^2)$ in the scattering model is not equal to $t_0^2$, as might be expected from the hyperbolic moveout equation in the constant velocity model. It is clear that the scattering model of the present method requires a different obliquity factor than the Kirchhoff model of conventional migration.

The detailed calculation of true amplitude weights would be similar to AVA analysis but with special attention being required for those factors that are unique to non-specular backscattering, such as the obliquity factor described above.

Final Filter-and-Sum Beamforming

The final operation in the present disclosure is the filter-and-sum beamforming operation. Conventional Wiener optimal filter theory described above allows filter weights to be determined by optimum criteria provided that a full rank covariance (or correlation) matrix can be determined. The rank must exceed the number of filter coefficients if an optimal filter is to be found. This requirement is prejudicial to finding filters that are adaptive to individual image points in the subsurface, since as the filter design becomes more localized in time (or depth), the local covariance matrix becomes increasingly rank deficient and a solution to the optimal filter problem is not well posed.

In the present disclosure, a filter for specular reverberation has been developed that does not require a covariance matrix. The filter is both deterministic and adaptive for each image point in the subsurface.

The filter weights are defined as those weights that decorrelate the amplitude and phase distributions of coherent specular interference such that the stacking of the interference component provides a sum that is approximately zero. The underlying assumption is that most of the interference is specular in origin but without any necessary underlying physical model apart from the interference being predominantly "vertical" waves due to reverberation (this is a valid assumption within the VTI earth model used above). The approach to determining filter weights may rely entirely on the random (stochastic) nature of these unknown wave fields. This filter is a specular reverberation filter.

The algorithm may be similar to "spectral whitening", where the frequency distribution of the acquired data set traces are "flattened" with respect to frequency in such a way that all frequencies are approximately equal in amplitude In the present method, this has the effect of modifying the spectral distribution not only of signals, but also of coherent interference. For image points that are local in time, the flattened distribution of frequencies implies a flattened distribution of phases.

Although the distribution of phases is flattened, there is no knowledge concerning the distribution of amplitudes corresponding to the spatial degrees of freedom of the beamformed output. This amplitude distribution is dependent on the geometry of the array, the image point, and the difference between reflected waves and diffracted waves. Diffracted waves are functions of the image point and the travel time whereas the reflected waves are randomly distributed within the subsurface. However, reflected waves will "leak" into the beamformed output if the reverberation satisfies the same travel time constraint as the diffracted wave. This is known as sidelobe energy and it is desirable to minimize this energy through appropriate shading of the sidelobe response. A conventional approach to shading the sidelobe response is described in, Kootsookos, P. J., Ward, D. B., Williamson, R. C., "Imposing pattern nulls on broadband array responses," J. Acoust. Soc. Am., Vol. 105, No. 6, June 1999.

The idea underlying the method of the present disclosure introduces renormalization weights for each sensor signal in such a way that the spatial distribution of phases is equally weighted for reverberation wavefields, but unequally weighted for the scattered diffraction wavefields of interest. If this criterion is satisfied, the coherent interference is suppressed during beamforming because, when the weighted sum is performed, there will be increased cancellation between in-phase and out-of-phase components of the reverberation fields across the array.

An example stochastic spectral decorrelation (SSD) algorithm may be implemented as follows: the traces are each individually pre-processed using spectral whitening in time so all frequencies are equally represented; equal-phase (equal travel-time) contours are calculated for specular backgrounds across the sensor array (since very little is known of the reflectors in the subsurface, only the simplest assumptions regarding these fields are used—namely that the wavefields are predominantly vertically oriented); the spectral distribution of receivers is determined with respect to phase (for each band of equal phase, a list of all receivers with that phase is compiled); the spatial degrees of freedom are then renormalized for specular backgrounds (akin to spectral whitening in the spatial domain) by calculating appropriate weights for each receiver from knowledge of the total number of receivers with the same phase); and finally, the resulting stochastic spectral decorrelation weights are applied during beamforming.

In practice, the performance of this SSD algorithm is modest, reducing by approximately 5 dB the undesirable reverberation interference power leaking through the side lobes of the sensor array response. On the other hand, the SSD filter is both deterministic and adaptive. Unlike conventional optimal filter algorithms, the SSD filter algorithm is scalable to sensor arrays of arbitrary complexity and size. Finally, this particular filter can itself provide the starting point for a conventional optimal filter calculation where the number of parameters does not exceed the rank of a localized covariance matrix. These parameters could be the coefficients of low-order two-dimensional shaping functions (using orthogonal polynomials), for example, modifying the filter weights for all receivers across the spatial aperture of the sensor array.

Imaging and Interpretation

Final imaging and interpretation of the beamformed output is performed using conventional display tools. Interpretation requires interplay between processing of the trace data and the simulation of trace data using synthetic models.

Figure 1B:
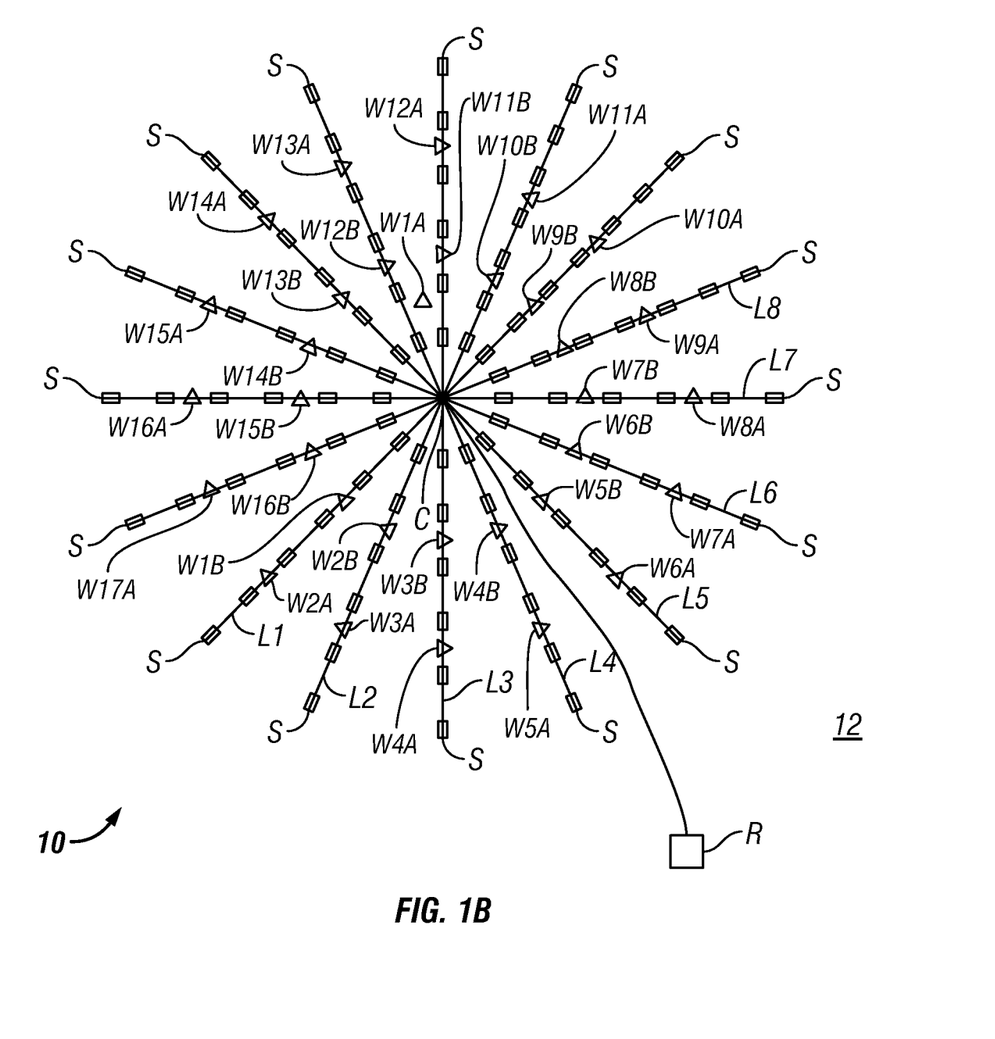
FIG. 1B shows another example source and sensor array configuration.
Figure 4:
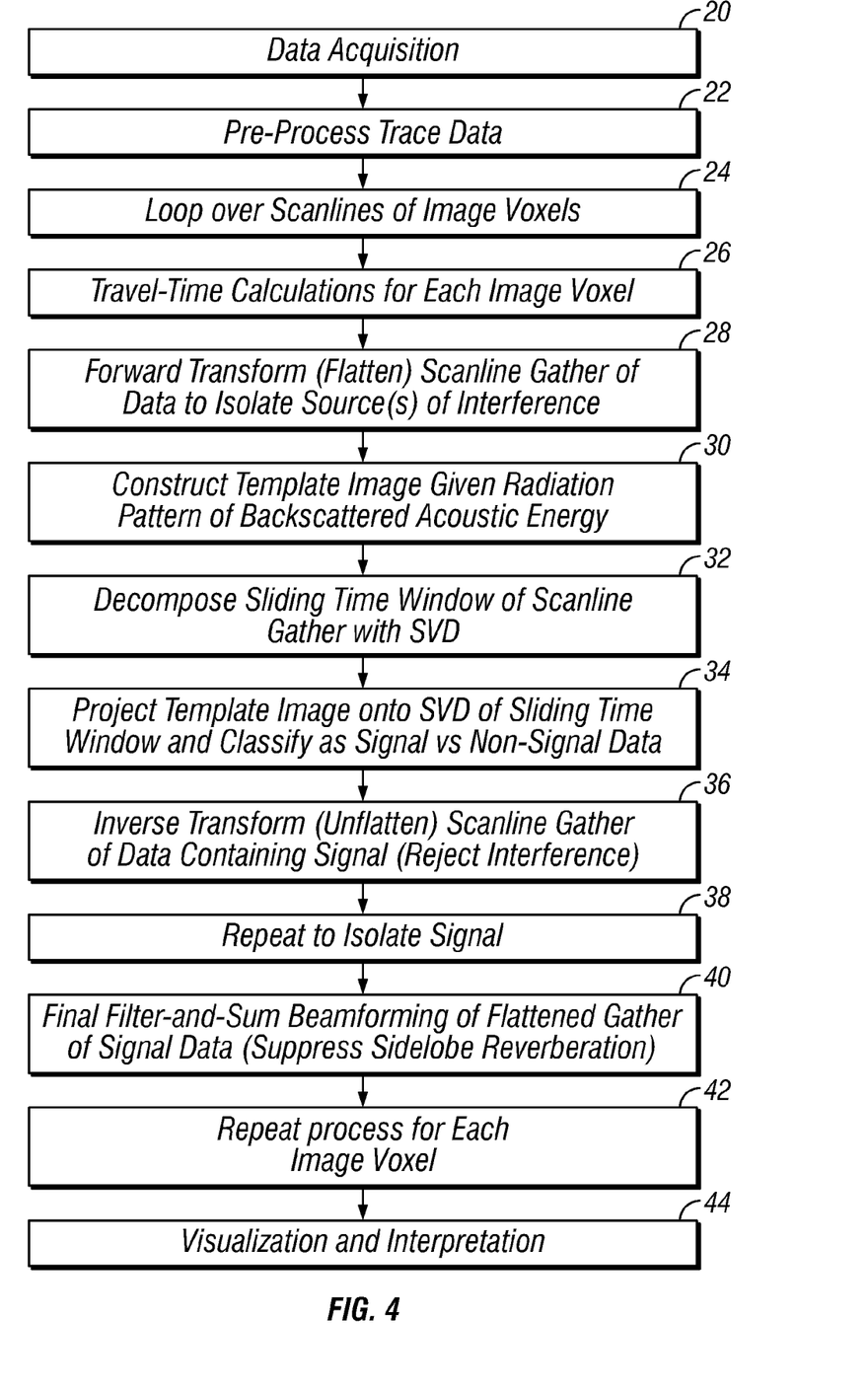
FIG. 4 shows a flow chart of an example method according to the present disclosure.

FIG. 4 shows a flow chart of an example implementation of a method according to the present disclosure. At 20, seismic signals may be acquired as explained with reference to FIG. 1A or 1B. At 22, preprocessing as explained above may be performed on the acquired seismic signals (e.g., individually for each recorded signal for each sensor (or each subcombination of sensors). At 24, a scanline gather may be generated containing the data for each voxel or image point in the subsurface volume being investigated. At 26, travel times for each source-image point-sensor combination for each scanline may be generated (i.e., to each subsurface point being imaged). At 28, a flattened scan line may be generated, e.g., using Eq. 8. At 30, a template image of an expected radiation pattern for various radiation patterns may be generated for each subsurface image point, e.g., using Eq. 12. At 32, SVD may be performed on sliding, discrete time windows of the flattened scanline gathers, e.g., using Eq. 24. At 34, the template image calculated at 30 may be applied to the SVD in sliding time windows to decompose (or classify) the received signal into desired signal components and noise components, e.g., using Eq. 25. At 36, the decomposed signal may be inverse transformed in order to repeat the adaptive classification process for additional components of interference or signal. At 38, the foregoing may be repeated for each subsurface image point (voxel), with Eq. 31 describing this iterative process for one particular analysis sequence. At 40, weighted filters may be applied to each final (or classified) signal for each image point, wherein the foregoing may be repeated for each voxel. At 44, an image may be generated by summing the weighted, time delayed signals for each subsurface image point. Note that at 42, the process of calculating travel time, generating a flattened (time delayed) scanline, constructing a template, decomposing the flattened scanline using SVD, projecting a template image onto the decomposed scanline and inverse transforming may be performed for each subsurface image point (voxel) to be evaluated.

Figure 5:
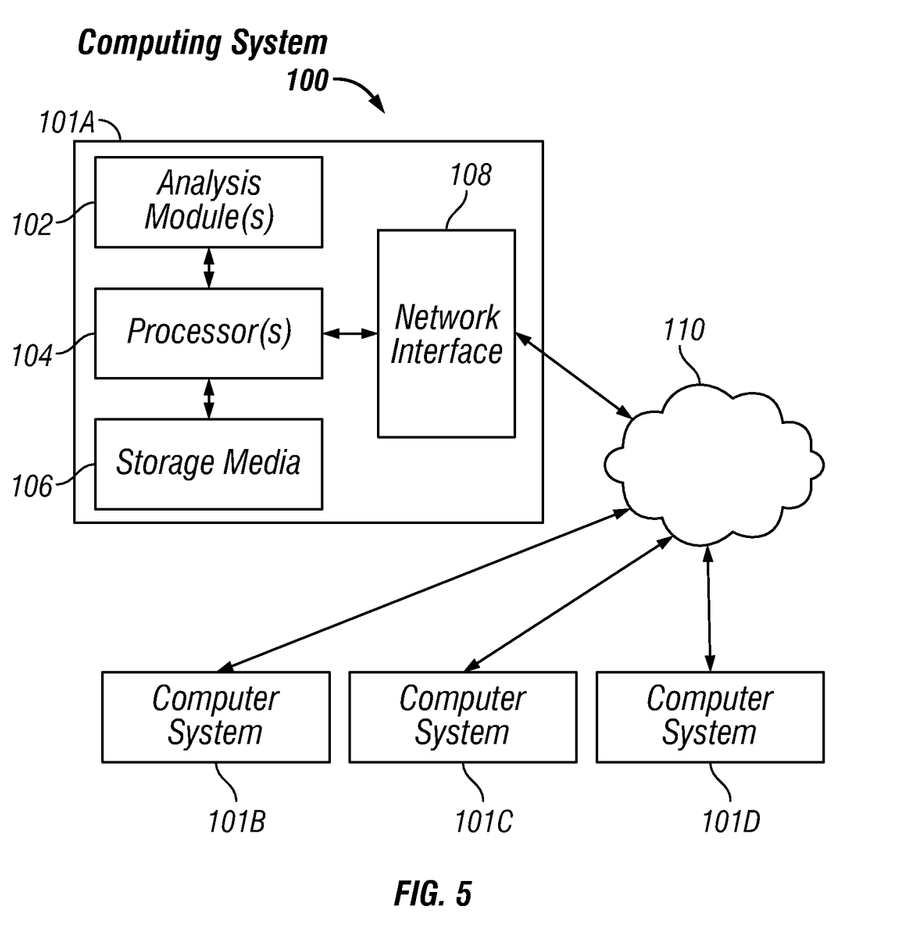
FIG. 5 shows an example computer system that may be used in some embodiments.

FIG. 5 shows an example computing system 100 in accordance with some embodiments. The computing system 100 may be an individual computer system 101A or an arrangement of distributed computer systems. The computer system 101A may include one or more analysis modules 102 that may be configured to perform various tasks according to some embodiments, such as the tasks shown in the flow chart in FIG. 4. To perform these various tasks, analysis module 102 may execute independently, or in coordination with, one or more processors 104, which may be connected to one or more storage media 106. The processor(s) 104 may also be connected to a network interface 108 to allow the computer system 101A to communicate over a data network 110 with one or more additional computer systems and/or computing systems, such as 101B, 101C, and/or 101D (note that computer systems 101B, 101C and/or 101D may or may not share the same architecture as computer system 101A, and may be located in different physical locations, for example, computer systems 101A and 101B may be at a well drilling location, while in communication with one or more computer systems such as 101C and/or 101D that may be located in one or more data centers on shore, aboard ships, and/or located in varying countries on different continents).

A processor can include a microprocessor, microcontroller, processor module or subsystem, programmable integrated circuit, programmable gate array, or another control or computing device.

The storage media 106 can be implemented as one or more computer-readable or machine-readable storage media. Note that while in the example embodiment of FIG.

5 the storage media 106 are depicted as within computer system 101A, in some embodiments, the storage media 106 may be distributed within and/or across multiple internal and/or external enclosures of computing system 101A and/or additional computing systems. Storage media 106 may include one or more different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. Note that the instructions discussed above may be provided on one computer-readable or machine-readable storage medium, or alternatively, can be provided on multiple computer-readable or machine-readable storage media distributed in a large system having possibly plural nodes. Such computer-readable or machine-readable storage medium or media may be considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

It should be appreciated that computing system 100 is only one example of a computing system, and that computing system 100 may have more or fewer components than shown, may combine additional components not depicted in the example embodiment of FIG. 5, and/or computing system 100 may have a different configuration or arrangement of the components depicted in FIG. 5. The various components shown in FIG. 5 may be implemented in hardware, software, or a combination of both hardware and software, including one or more signal processing and/or application specific integrated circuits.

Further, the steps in the processing methods described above may be implemented by running one or more functional modules in information processing apparatus such as general purpose processors or application specific chips, such as ASICs, FPGAs, PLDs, or other appropriate devices. These modules, combinations of these modules, and/or their combination with general hardware are all included within the scope of the present disclosure.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for imaging a volume in the Earth's subsurface, comprising
   a) accepting as input to a computer recordings of signals acquired by a plurality of seismic sensors disposed in a selected pattern above the volume in response to repeated actuations of at least one seismic energy source, the recorded signals from each sensor summed for the plurality of actuations of the at least one seismic energy source;
   b) in the computer, calculating a travel time of seismic energy from a position of the at least one seismic energy source to at least one selected image point in the volume and from the at least one image point to each seismic sensor;
   c) in the computer, generating a time-delayed scanline gather from the travel times using a predetermined model of spatial distribution of acoustic properties of formations in the volume;
   d) in the computer, generating a template image of back-scattered acoustic energy from the at least one image point based on the predetermined model;
   e) in the computer, performing singular value decomposition on the time-delayed scanline gather;
   f) in the computer, projecting the template image onto the decomposed time delayed scanline gather to determine a signal component and an interference component therein;
   g) in the computer, inverse time-delay transforming the determined signal components prior to further performing (c) through (f) until a selected number of components of interference have been determined and subsequently removed from the signal component;
   h) in the computer, calculating a weight for each sensor to implement a spatial filter to be applied to the time delayed signal component from which the selected number of interference components have been removed;
   i) in the computer, applying the product of each weight to each sensor signal and summing the weighted sensor signals from all the seismic sensors such that the at least one image point corresponds to a focal point of beamforming; and
   j) at least one of storing and displaying an output of the beamforming at the at least one selected image point.

2. The method of claim 1 further comprising repeating (b) through (j) for a plurality of selected image points.

3. The method of claim 1 wherein the generating a template image comprises in the computer generating an outer product of a wavelet defined over a selected time window and a complete set of amplitudes defined over spatial dimensions of the selected pattern of seismic sensors.

4. The method of claim 1 wherein the selected pattern comprises lines of sensors radially extending from a center point of an array.

5. The method of claim 1 wherein a number of seismic sensors in the selected pattern and a longitudinal spacing between seismic sensors are related to a maximum seismic energy frequency to be detected from the subsurface.

6. The method of claim 1 wherein energy from the at least one seismic energy source is directed toward the selected focal point.

7. The method of claim 6 wherein the energy is directed by actuating each of a plurality of individual seismic energy sources at a time causing an output thereof to be directed substantially toward the selected point.

8. The method of claim 1 wherein the at least one seismic energy source is substantially collocated with a center of the selected pattern.

9. The method of claim 1 wherein signals acquired by the plurality of seismic sensors comprise energy from an auxiliary seismic energy source positioned substantially directly above the image point.

10. The method of claim 1 wherein the template image is generated for each of a plurality of selected image points in the volume.

11. The method of claim 1 wherein the spatial filter applied to the time delayed signal component is calculated for each of a plurality of selected image points.

\* \* \* \* \*